(No Model.)
J. L. REED.
PACKING FOR PISTON RODS.
No. 270,483. Patented Jan. 9, 1883.
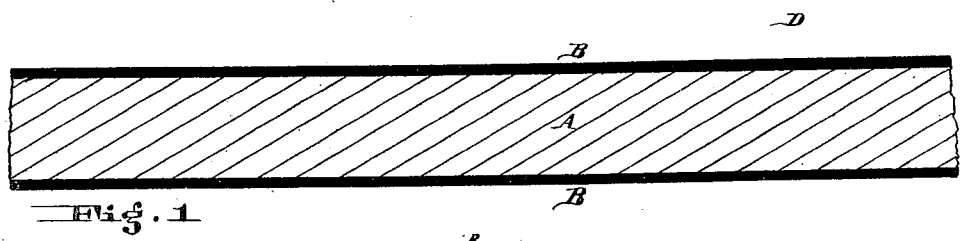
Fig. 1
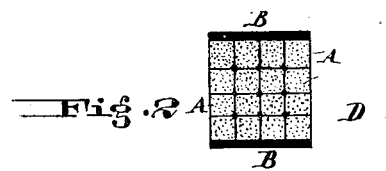
Fig. 2
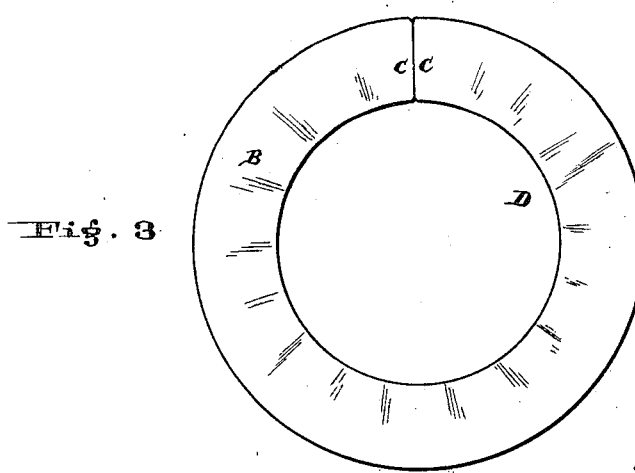
Fig. 3
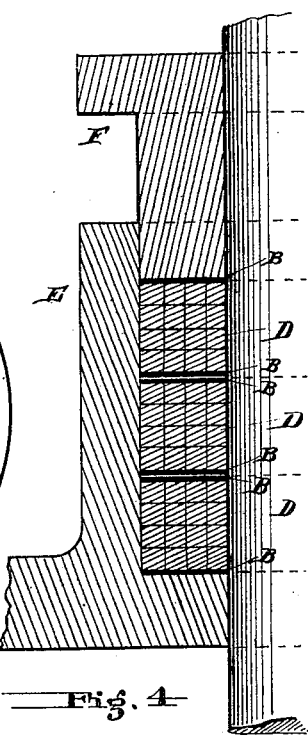
Fig. 4
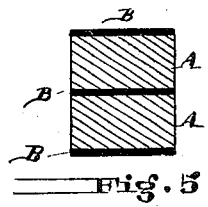
Fig. 5
Attest
L. J. Matz
Joseph Nolan
Inventor
James L. Reed
By his atty

UNITED STATES PATENT OFFICE.

JAMES L. REED, OF PHILADELPHIA, PENNSYLVANIA.

PACKING FOR PISTON-RODS.

SPECIFICATION forming part of Letters Patent No. 270,483, dated January 9, 1883.

Application filed November 20, 1882. (No model.)

*To all whom it may concern:*

Be it known that I, JAMES L. REED, of the city and county of Philadelphia, and State of Pennsylvania, have invented an Improvement in Packing for Piston-Rods, &c., of which the following is a specification.

My invention has reference to steam-packing in general, but more particularly to packing for piston and valve rods; and it consists of one or more alternate layers of asbestus and flexible packing, the said packing being rectangular or square in cross-section, as more fully set forth in the following specification, and shown in the accompanying drawings, which form part thereof.

Heretofore asbestus steam-packing has been made by twisting one or more strands of asbestus into a rope, with or without a center, the exterior surface being rubbed down or inclosed in a plaited covering. In all cases the packing was round in cross-section, and when cut off into short lengths and bent into rings the centers of said packing shorten, making the ring of uneven solidity, causing the gland to bind. Further, it is necessary to squeeze the said packing down tightly to make it fit close around the valve or piston rod, and as this causes the packing to press against the rods in thin edges, thereby rendering the same liable to be blown out in shreds, and from the great pressure required to make the packing steam-tight, the asbestus packs together and finally becomes one solid mass, similar to the native article, and the packing is then useless and must be cut out, causing much delay and labor.

The object of my invention is to overcome all of the above objectionable features by making the packing rectangular or square in cross-section, and providing suitable flexible layers on the packing to give elasticity and prevent any possibility of two layers of asbestus packing together in time.

In the drawings, Figure 1 is a side elevation of my improved asbestus packing. Fig. 2 is a cross-section or end view of same. Fig. 3 shows a section of the packing bent into a ring. Fig. 4 is a sectional elevation of a stuffing-box, gland, and packing in position; and Fig. 5 is a cross-section of a modified form of packing.

In making my packing I take a number of strands of asbestus, A, and twist them up loosely, and then press or form them up in a suitable press, so as to make the rope rectangular or square in cross-section. When this is done I coat the two opposite sides with a solution of rubber, B, or other equivalent liquid elastic substance, as gutta-percha. Two of the sides are thus formed with flat asbestus and the other two sides with the elastic material. If desired, a series of coats of liquid rubber may be used; or thin sheets of rubber or other elastic material may be secured upon the top and bottom sides of the packing by cement of any kind. The packing may be cut off in the required lengths and bent into a ring, as shown in Fig. 3, and the two free ends are made to butt against each other.

In the packings heretofore used it was necessary to tie the free ends to prevent the strands untwisting; but with my improved packing the free ends, C, cannot untwist, as the strands are held together by the rubber. These rings D are then placed in the stuffing-box E, and the gland F is pressed in, as shown in Fig. 4, in which it is seen that there is an elasticity in the packing in the line of movement of the piston-rod, and a continuous surface of asbestus pressing against said piston-rod to insure a steam-tight joint without excessive pressure from the gland or any liability of injury to the packing. If desired, a series of asbestus layers may be interposed between a series of rubber layers, as shown in Fig. 5, and the asbestus may be made in large sheets and interposed between corresponding sheets of any elastic material, and then the compound sheet cut up into strips; or the sheet-packing may be used as such in certain cases.

I do not limit myself to the details of construction, as the process of manufacture may be greatly varied without departing from my invention.

It will be readily understood that the asbestus may be coated with the elastic substance on one side only, as in this case, when the packing is laid ring after ring in the stuffing-box, there will be a single layer of elastic material interposed between the layers of asbestus; but, though this is possible, I do not prefer it, as the packing would be more liable to lose its shape than when coated on two of its sides.

It is also evident that for very small packings a single strand of asbestos may be used with the elastic coating on one or two of its sides, as in this case the elastic material will hold the short fibers of the asbestos together, making a strong packing.

In place of compressing or forming the asbestos in molds, it may be passed between rollers properly grooved, and, if desired, the packing may be used without the rubber or elastic coatings and just as it leaves the mold or rollers.

Having now described my invention, what I claim as new, and desire to secure by Letters Patent, is—

1. The herein-described method of manufacturing asbestos packing, which consists in loosely twisting together strands of asbestos, then subjecting them to pressure to form them into a rectangular or square cross-section, and finally coating two of its sides diametrically opposite with an elastic material, substantially as set forth.

2. A packing consisting of the ordinary twisted strands of asbestos wick packing of commerce, laid together and compressed in a mold or between rollers to form a rectangle or square in cross-section, and having one or more of its sides coated with an elastic material, substantially as and for the purpose specified.

3. A packing consisting of asbestos fibers twisted or formed into a strand or rope, and provided with longitudinal lines of a flexible or elastic material, said material being arranged parallel to the center of the strand or rope and upon the surface of the same, substantially as and for the purpose specified.

4. A packing consisting of one or more layers of asbestos interposed between two or more layers of an elastic material, the said asbestos and elastic material being firmly cemented or otherwise secured together, substantially as and for the purpose specified.

5. A packing which is provided with four surfaces, forming a rectangle or square in cross-section, two of said surfaces exposing asbestus and the other two an elastic material, said asbestos and elastic surfaces being arranged alternately about said packing and in longitudinal lines parallel with the center.

6. An asbestos packing formed of strands of asbestos twisted into a rope and compressed or formed into a rectangle or square in cross-section, substantially as set forth.

In testimony of which invention I hereunto set my hand.

JAMES L. REED.

Witnesses:
R. M. HUNTER,
R. S. CHILD, Jr.